(12) United States Patent
Hsu et al.

(10) Patent No.: US 8,454,470 B2
(45) Date of Patent: Jun. 4, 2013

(54) POWER GENERATING APPARATUS AND METHOD FOR ASSISTING ENGINE

(75) Inventors: Hsin Chi Hsu, Taoyuan County (TW); Tien Chuang, Chiayi County (TW); Shen Lung Hsu, Taoyuan County (TW); Kun Ho Hsiao, Pingtung County (TW)

(73) Assignee: Shen Yang Technologies Enterprise Co., Ltd. (TW)

( * ) Notice: Subject to any disclaimer, the term of this patent is extended or adjusted under 35 U.S.C. 154(b) by 831 days.

(21) Appl. No.: 12/623,877

(22) Filed: Nov. 23, 2009

(65) Prior Publication Data

US 2010/0137099 A1    Jun. 3, 2010

(30) Foreign Application Priority Data

Nov. 28, 2008    (TW) .................................. 97146200

(51) Int. Cl.
*F16H 48/30*    (2012.01)
(52) U.S. Cl.
USPC .............................. 475/150; 475/5; 180/65.26
(58) Field of Classification Search
USPC ................ 475/5, 149, 150; 180/65.25, 65.26, 180/65.285
See application file for complete search history.

(56) References Cited

U.S. PATENT DOCUMENTS

| | | | |
|---|---|---|---|
| 6,048,288 A * | 4/2000 | Tsujii et al. ....................... | 477/5 |
| 6,155,366 A | 12/2000 | Lin | |
| 6,889,126 B2 * | 5/2005 | Komiyama et al. .............. | 701/22 |
| 7,035,727 B2 * | 4/2006 | De La Salle et al. ............ | 701/93 |
| 2003/0092529 A1 | 5/2003 | Gu et al. | |
| 2003/0230442 A1 | 12/2003 | Huang et al. | |
| 2005/0101433 A1 * | 5/2005 | Joe ..................................... | 477/5 |
| 2007/0095587 A1 | 5/2007 | DuCharme | |
| 2007/0294016 A1 | 12/2007 | Braun et al. | |
| 2008/0076615 A1 * | 3/2008 | Kim ................................. | 475/5 |
| 2010/0197449 A1 * | 8/2010 | Imamura et al. ................. | 477/3 |

FOREIGN PATENT DOCUMENTS

| | | |
|---|---|---|
| FR | 2885328 A1 | 5/2005 |
| JP | 2003134613 A | 5/2003 |
| JP | 2004122925 A | 4/2004 |
| JP | 2007261348 A | 3/2006 |
| JP | 2008239041 A | 10/2008 |
| KR | 507073 | 8/2005 |

(Continued)

OTHER PUBLICATIONS

Chinese Office Action dated Mar. 26, 2012 pertaining to U.S. Appl. No. 12/623,877, filed Nov. 23, 2009.

(Continued)

*Primary Examiner* — Justin Holmes
*Assistant Examiner* — Huan Le
(74) *Attorney, Agent, or Firm* — Dinsmore & Shohl LLP

(57) ABSTRACT

The present invention relates to a power generating apparatus and method for assisting an engine, capable of supplying auxiliary power to an engine transmission shaft when the engine is transmitting power to the engine transmission shaft via a gearbox. The power generating apparatus comprises: a power supply unit for providing a high voltage power source; a driver for converting the high voltage power source into a driving power source and transmitting same; and a direct-current motor for converting the driving power source transmitted by the driver into the auxiliary power to be transmitted to the engine transmission shaft; wherein the rotational speed of the direct-current motor driving the engine transmission shaft is enabled to be higher than that of the engine driving the engine transmission shaft, so as to supply the auxiliary power to the engine transmission shaft.

10 Claims, 2 Drawing Sheets

FOREIGN PATENT DOCUMENTS

| | | | |
|---|---|---|---|
| TW | 1242523 | B | 11/2005 |
| TW | 1243134 | B | 11/2005 |
| TW | 200840745 | B | 10/2008 |

OTHER PUBLICATIONS

Japanese Office Action dated Apr. 15, 2011 pertaining to U.S. Appl. No. 12/623,877, filed Nov. 23, 2009.

Japanese Office Action dated Jul. 27, 2011 pertaining to U.S. Appl. No. 12/623,877, filed Nov. 23, 2009.

Japanese Office Action dated Nov. 15, 2011 pertaining to U.S. Appl. No. 12/623,877, filed Nov. 23, 2009.

Korean Office Action dated Apr. 20, 2011 pertaining to U.S. Appl. No. 12/623,877, filed Nov. 23, 2009.

Taiwan Office Action dated Jul. 4, 2011 pertaining to U.S. Appl. No. 12/623,877, filed Nov. 23, 2009.

UK Office Action dated Mar. 15, 2010 pertaining to U.S. Appl. No. 12/623,877, filed Nov. 23, 2009.

\* cited by examiner

POWER GENERATING APPARATUS AND METHOD FOR ASSISTING ENGINE

FIELD OF THE INVENTION

The present invention relates to an apparatus and method for generating auxiliary power by using electric power generated by an engine, and particularly a power generating apparatus and method for assisting an engine, with which the fuel consumption is reduced.

BACKGROUND TO THE INVENTION

Oil-saving, energy conservation and environmental protection are challenges for the whole human beings in the 21st century. The United Nations invited representatives of over 100 nationals to sign the "Kyoto Protocol" in Japan in Feb. 6, 2005, hoping that each country in the world obeyed the restriction on $CO_2$ emission within a time limit to prevent the earth's environment and climate from continuously deteriorating. To do this, the first thing is the policy of energy conservation and carbon reduction.

The high oil price era came in August 2008, when the price of crude oil was as high as up to $150 per barrel, causing the upsurge in fuel cost of car, ship and airplane in each country of the world, the economic development to be shrouded in shadow, and even the price index of many countries to soar due to the oil price. At the same time, the ice layers in the earth's north and south poles have been gradually collapsing into the sea and the climate has been rapidly deteriorating, so many meteorologists and scientists continuously appeal to the whole world for obeying energy conservation and carbon reduction to salvage the disaster of human beings.

A hybrid car is thus presented to the public in view of the demand for oil saving and environmental protection. For example, according to the technique disclosed in U.S. Pat. No. 5,935,040, an internal combustion engine and a servomotor are provided in a car at the same time, with a very high capacity battery also provided for storing electric energy when the engine is running. After the amount of electric energy stored in the battery reaches a predetermined limit, the engine can be shut down and the moving of the car can still be driven only by the servomotor. Also, if necessary, the engine and the servomotor can operate simultaneously so as to provide a larger output of power.

However, the hybrid car requires a servomotor of larger horsepower to output a larger torque to transmit power to a transmission shaft, and requires a large capacity battery for supplying electric power for a long time. Therefore, the equipment cost is greatly increased. Further, it is quite difficult for designing and installation to assemble such a huge servomotor and battery into the limited space of the car.

SUMMARY OF THE INVENTION

The present invention provides a power generating apparatus and method for assisting an engine. The power generating apparatus can supply auxiliary power to a transmission shaft of a car when the car is running especially in a low speed so as to achieve the effects of oil saving and carbon reduction and also have the advantages of easy installation and low equipment cost.

According to the first aspect of the present invention, a power generating apparatus for assisting an engine, capable of supplying auxiliary power to an engine transmission shaft when the engine is transmitting power to the engine transmission shaft via a gearbox, is provided. The power generating apparatus comprises: a power supply unit for providing a high voltage power source; a driver for converting the high voltage power source into a driving power source and transmitting same; and an electric to kinetic energy converter for converting the driving power source transmitted by the driver into the auxiliary power to be transmitted to the engine transmission shaft; wherein the rotational speed of the electric to kinetic energy converter driving the engine transmission shaft is enabled to be higher than that of the engine driving the engine transmission shaft, so as to supply the auxiliary power to the engine transmission shaft.

According to the second aspect of the present invention, a power generating method for assisting an engine, for supplying auxiliary power from a power generating apparatus to an engine transmission shaft when the engine is transmitting power to the engine transmission shaft via a gearbox, is provided. The power generating method comprises the steps of: a power supply unit of the power generating apparatus providing a high voltage power source; a driver of the power generating apparatus converting the high voltage power source into a driving power source to be transmitted to an electric to kinetic energy converter of the power generating apparatus; the electric to kinetic energy converter of the power generating apparatus converting the driving power source into the auxiliary power to be transmitted to the engine transmission shaft; and enabling the rotational speed of the electric to kinetic energy converter driving the engine transmission shaft to be higher than that of the engine driving the engine transmission shaft, so as to supply the auxiliary power to the engine transmission shaft.

Based on the first and second aspects of the present invention, the power generating apparatus further comprises: a controller for generating a control signal to the driver to control the driving power source of the driver, so as to set the rotational speed of the engine transmission shaft driven by the electric to kinetic energy converter; a first power transmission mechanism for transmitting the auxiliary power transmitted by the electric to kinetic energy converter; a continuously variable transmission for transmitting the auxiliary power transmitted by the first power transmission mechanism; and a second power transmission mechanism for transmitting the auxiliary power transmitted by the continuously variable transmission to the engine transmission shaft.

Based on the first and second aspects of the present invention, the power generating apparatus further comprises: a controller for generating a control signal to the driver to control the driving power source of the driver, so as to set the rotational speed of the engine transmission shaft driven by the electric to kinetic energy converter; and a power transmission mechanism for transmitting the auxiliary power transmitted by the electric to kinetic energy converter to the engine transmission shaft.

DESCRIPTION OF PREFERRED EMBODIMENTS

Figure 1:
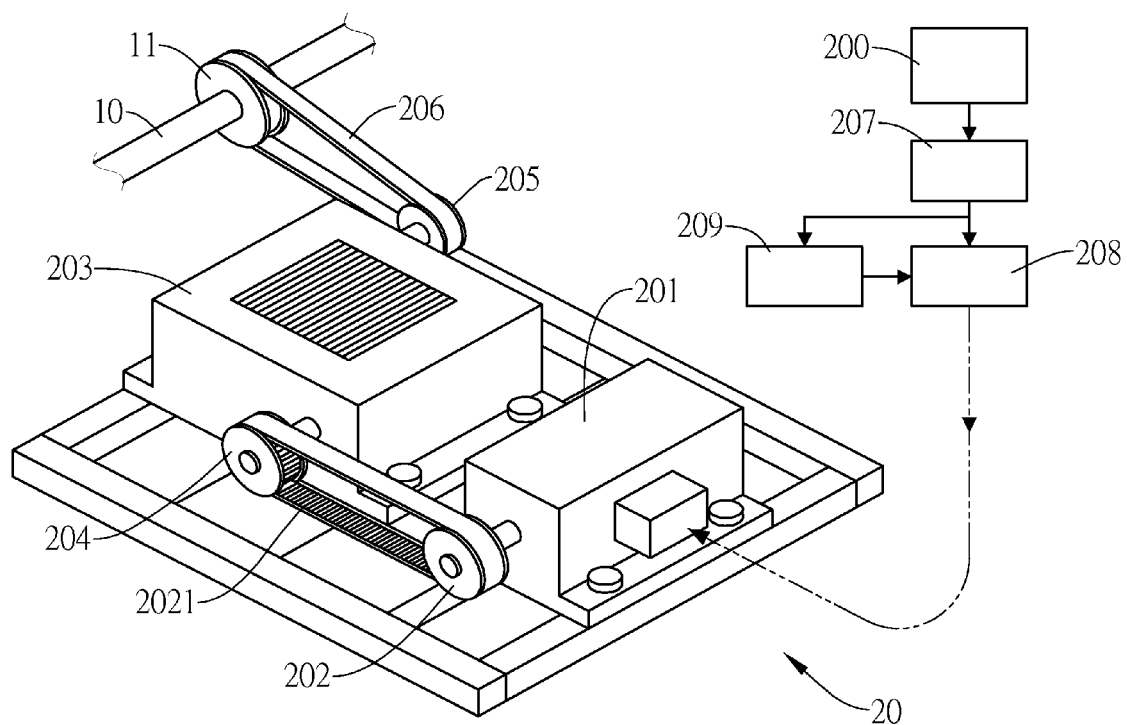
FIG. 1 is a diagram of the power generating apparatus for assisting an engine according to the first embodiment of the present invention.

FIG. 1 is a diagram of the power generating apparatus for assisting an engine according to the first embodiment of the present invention. The first embodiment shown in FIG. 1 gives the application of hybrid car as an example, while the general structure of the car described below is well known to the persons having ordinary knowledge in this technical field and the description thereof will thus be omitted.

In FIG. 1, when an engine (not shown) of a car generates power by burning fuel, the generated power is transmitted to an engine transmission shaft 10 via a gearbox and a power generating apparatus 20 of the car supplies auxiliary power to the engine transmission shaft 10. The power generating apparatus 20 comprises the following structure.

As shown in FIG. 1, a power supply unit composed of a battery 200 and a converter 207 is used for providing a high voltage power source, in which the converter 207 converts a low voltage (e.g. 12V) power source supplied by the battery 200 into the high voltage (e.g. 220V) power source to be supplied to a driver 208. In another embodiment, a generator (not shown) of the car can replace the battery 200 shown in FIG. 1 to supply the low voltage power source to the converter 207, and the converter 207 converts the low voltage power source as supplied into the high voltage power source to be supplied to the driver 208. Also, the generator is driven by the engine.

An electric to kinetic energy converter composed of a direct-current motor 201 is used for converting a driving power source into the auxiliary power to be transmitted to the engine transmission shaft 10. A driver 208 converts the high voltage supplied by the converter 207 into the driving power source and transmitting same to the direct-current motor 201. A controller 209 generates a control signal to the driver 208 to control the driving power source of the driver 208, so as to set the rotational speed of the engine transmission shaft 10 driven by the direct-current motor 201.

A first power transmission mechanism composed of a first timing belt pulley 202, a timing belt 2021 and a second timing belt pulley 204 transmits the auxiliary power transmitted by the direct-current motor 201 to a continuously variable transmission 203. The first timing belt pulley 202 is fitted on a rotation shaft of the direct-current motor 201, the second timing belt pulley 204 is fitted on a rotation shaft of the continuously variable transmission 203, and the timing belt 2021 is mounted between the first timing belt pulley 202 and the second timing belt pulley 204.

A second power transmission mechanism composed of a one-way driving belt pulley 205, a transmission belt 206 and a driving belt pulley 11 transmits the auxiliary power transmitted by the continuously variable transmission 203 to the engine transmission shaft 10. The one-way driving belt pulley 205 is fitted on another rotation shaft of the continuously variable transmission 203, the driving belt pulley 11 is fitted on the engine transmission shaft 10, and the transmission belt 206 is mounted between the one-way driving belt pulley 205 and the driving belt pulley 11. Also, the one-way driving belt pulley 205 can be a commercial available belt pulley having a one-way bearing structure.

In FIG. 1, the converter 207 converts the low voltage of the battery 200 into the high voltage power source, which is transmitted to the driver 208, and the controller 209 transmits the control signal for setting the rotational speed of the direct-current motor 201 to the driver 208 to control the driving power source transmitted by the driver 208.

The driver 208 transmits the driving power source to drive the rotation of the direct-current motor 201 to produce a rotational speed and the auxiliary power. The rotational speed and auxiliary power produced by the direct-current motor 201 are transmitted to the continuously variable transmission 203 via the first timing belt pulley 202, the timing belt 2021 and the second timing belt pulley 204. The continuously variable transmission 203 transmits the rotational speed and auxiliary power to the engine transmission shaft 10 via the one-way driving belt pulley 205, the transmission belt 206 and the driving belt pulley 11.

When the driver 208 controlled by the controller 209 transmits the driving power source to the direct-current motor 201, the direct-current motor 201 can be rotated at a rotational speed set by the controller. When the rotational speed of the direct-current motor 201 (i.e. the rotational speed of the continuously variable transmission 203 driving the engine transmission shaft 10) is lower than the rotational speed of the engine driving the engine transmission shaft 10, because the one-way driving belt pulley 205 rotates only in a uni-direction, the direct-current motor 201 is caused to idle; namely, the direct-current motor 201 does not generate the auxiliary power to the engine transmission shaft 10, and all the power of the engine transmission shaft 10 is supplied by the power generated by the engine burning the fuel at this time.

When the rotational speed of the direct-current motor 201 (i.e. the rotational speed of the continuously variable transmission 203 driving the engine transmission shaft 10) is higher than the rotational speed of the engine driving the engine transmission shaft 10, the rotational speed of the engine transmission shaft 10 will be the rotational speed of the direct-current motor 201, and the auxiliary power is supplied to the engine transmission shaft 10 by the continuously variable transmission 203, so that the engine can provide the required power after a deduction for the auxiliary power to the engine transmission shaft 10. Thus, the fuel that the engine needs to burn can be reduced so as to achieve the effects of energy conservation and carbon reduction.

In addition, the battery 200 shown in FIG. 1 is a battery with which a car is equipped, and it is not required to install a large capacity battery having a larger volume. Also, the direct-current motor 201 has a volume smaller than that of a servomotor of the prior art. Therefore, the installation of the power generating apparatus of this embodiment is easy and the equipment cost of the power generating apparatus is low.

Figure 2:
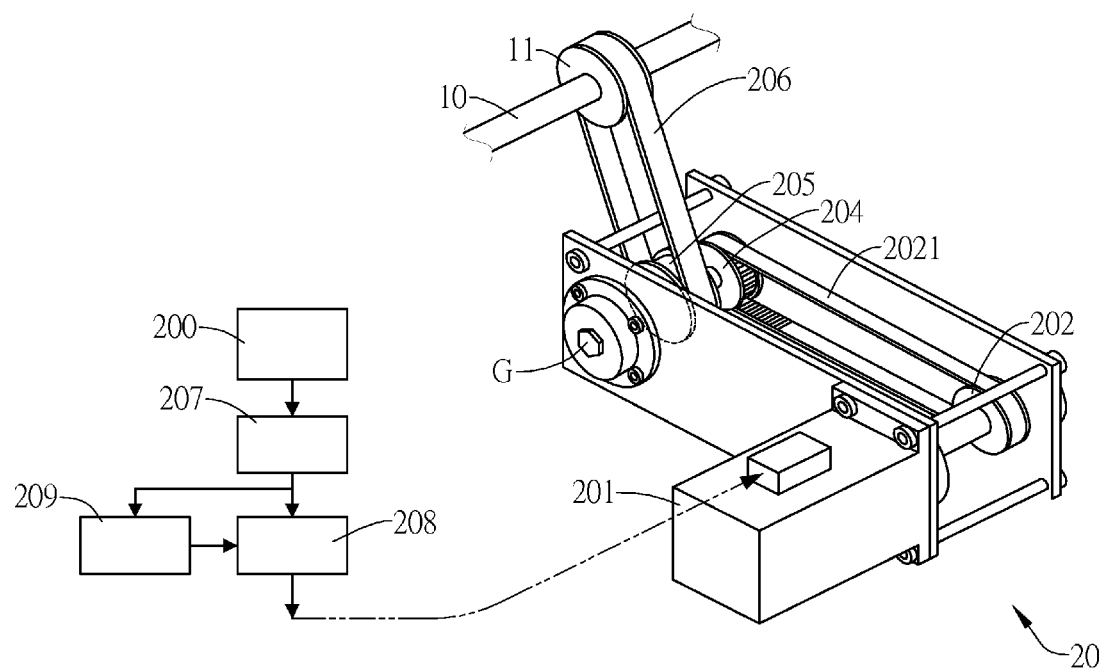
FIG. 2 is a diagram of the power generating apparatus for assisting an engine according to the second embodiment of the present invention.

FIG. 2 is a diagram of the power generating apparatus for assisting an engine according to the second embodiment of the present invention. The same components in FIG. 2 as those in FIG. 1 are given the same reference numerals and the description thereof is omitted.

The structure of FIG. 2 that is different from that of FIG. 1 is a power transmission mechanism. The power transmission mechanism composed of a first timing belt pulley 202, a timing belt 2021, a second timing belt pulley 204, a rotation shaft G, a one-way driving belt pulley 205, a transmission belt 206 and a driving belt pulley 11 transmits the rotational speed and auxiliary power transmitted by the direct-current motor 201 to the engine transmission shaft 10. The first timing belt pulley 202 is fitted on the rotation shaft of direct-current motor 201, the second timing belt pulley 204 is fitted on one end of the rotation shaft G, the timing belt 2021 is mounted between the first timing belt pulley 202 and the second timing belt pulley 204, the one-way driving belt pulley 205 is fitted on another end of the rotation shaft G, the driving belt pulley 11 is fitted on the engine transmission shaft 10, and the transmission belt 206 is mounted between the one-way driving belt pulley 205 and the driving belt pulley 11.

Similarly, the driver 208 transmits the driving power source to drive the rotation of the direct-current motor 201 to produce the rotational speed and auxiliary power. The rotational speed and auxiliary power produced by the direct-current motor 201 are transmitted to the engine transmission shaft 10 via the first timing belt pulley 202, the timing belt 2021, the second timing belt pulley 204, the rotation shaft G, the one-way driving belt pulley 205, the transmission belt 206 and the driving belt pulley 11.

When the driver 208 controlled by the controller 209 transmits the driving power source to the direct-current motor 201, the direct-current motor 201 can be rotated at a rotational speed set by the controller. When the rotational speed of the direct-current motor 201 (i.e. the rotational speed of the continuously variable transmission 203 driving the engine transmission shaft 10) is lower than the rotational speed of the engine driving the engine transmission shaft 10, because the one-way driving belt pulley 205 rotates only in a uni-direction, the direct-current motor 201 is caused to idle; namely, the direct-current motor 201 does not generate the auxiliary power to the engine transmission shaft 10, and all the power of the engine transmission shaft 10 is supplied by the power generated by the engine burning the fuel at this time.

When the rotational speed of the direct-current motor 201 (i.e. the rotational speed of the continuously variable transmission 203 driving the engine transmission shaft 10) is higher than the rotational speed of the engine driving the engine transmission shaft 10, the rotational speed of the engine transmission shaft 10 will be the rotational speed of the direct-current motor 201, and the auxiliary power is supplied to the engine transmission shaft 10 by the continuously variable transmission 203, so that the engine can provide the required power after a deduction for the auxiliary power to the engine transmission shaft 10. Thus, the fuel that the engine needs to burn can be reduced so as to achieve the effects of energy conservation and carbon reduction.

Therefore, the embodiment of FIG. 2 can also achieve the effects and advantages of the embodiment of FIG. 1.

According to the embodiments of FIGS. 1 and 2, their practical effects of applying to a car are shown in Table 1:

TABLE 1

| Travelling Route | Kilometrage | Oil Consumption (without PGA*) | Oil Consumption (with PGA*) |
|---|---|---|---|
| Taipei-Freeway-Taichung | 208 km | 28.01 L | 17.83 L |
| Pingjen-Freeway-Hsiangshan-Freeway-Pingjen | 133 km | 17.01 L | 10 L |

*Power Generating Apparatus

In the first case (Taipei-Freeway-Taichung), the kilometrage for when the power generating apparatus is used is 11.6 km per liter, while the kilometrage for when the power generating apparatus is not used is 7.42 km per liter. In the second case (Pingjen-Freeway-Hsiangshan-Freeway-Pingjen), the kilometrage for when the power generating apparatus is used is 13.3 km per liter, while the kilometrage for when the power generating apparatus is not used is 7.81 km per liter. It can be found from the above experimental results that the power generating apparatus of the present invention when applied to a car can surely achieve the effects of energy conservation and oil saving. (Both the first and second cases achieve 50% or above of energy conservation and oil saving.)

In addition, the application of the embodiments of the present invention is not limited to the car, but can be widely used in various vehicles such as ship, airplane, military armored car, etc., and also in the field of thermal power generation.

While the present invention has been described above with reference to the preferred embodiments and illustrative drawings, it should not be considered as limited thereby. Various equivalent alterations, omissions and modifications made to its configuration and the embodiments by the skilled persons could be conceived of without departing from the scope of the present invention.

[DESCRIPTION OF REFERENCE NUMERALS]

| | |
|---|---|
| 10 | transmission shaft |
| 11 | driving belt pulley |
| 20 | power generating apparatus |
| 200 | battery |
| 201 | direct-current motor |
| 202 | first timing belt pulley |
| 203 | continuously variable transmission |
| 204 | second timing belt pulley |
| 205 | one-way driving belt pulley |
| 206 | transmission belt |
| 207 | converter |
| 208 | driver |
| 209 | controller |
| 2021 | timing belt |
| G | rotation shaft |

What is claimed is:

1. An apparatus for assisting an engine, capable of supplying auxiliary power to an engine shaft when the engine is transmitting power to the engine shaft via a gearbox, the apparatus comprising:
a power supply unit for providing a high voltage power;
a driver for converting the high voltage power into a driving power and transmitting same;
an electric motor for converting the driving power transmitted by the driver into the auxiliary power to be transmitted to the engine shaft; and
wherein the rotational speed of the electric motor driving the engine shaft is controlled to be higher than that of the engine driving the engine shaft, when the engine is transmitting power to the engine shaft, so as to supply the auxiliary power to the engine shaft, and
wherein the electric motor is a direct-current motor, and the power supply unit comprises:
a battery or a generator, the generator being driven by the engine; and
a converter for converting a low voltage of the battery or generator into the high voltage power to be supplied to the driver.

2. The apparatus according to claim 1, further comprising:
a controller for generating a control signal to the driver to control the driving power of the driver, so as to set the rotational speed of the engine shaft driven by the electric motor;
a first power transmission mechanism for transmitting the auxiliary power transmitted by the electric motor;
a continuously variable transmission for transmitting the auxiliary power transmitted by the first power transmission mechanism; and
a second power transmission mechanism arranged for transmitting the auxiliary power transmitted by the continuously variable transmission to the engine shaft.

3. The apparatus according to claim 2, wherein the first power transmission mechanism is composed of a first timing belt pulley, a timing belt and a second timing belt pulley wherein the first timing belt pulley is fitted on the electric motor, the second timing belt pulley is fitted on the continuously variable transmission, and the timing belt is mounted between the first timing belt pulley and the second timing belt pulley; the second power transmission mechanism is composed of a one-way driving belt pulley, a transmission belt and a driving belt pulley wherein the one-way driving belt pulley is fitted on the continuously variable transmission, the driving belt pulley is fitted on the engine shaft, and the transmission belt is mounted between the one-way driving belt pulley and the driving belt pulley.

4. The apparatus according to claim 1, further comprising:
a controller for generating a control signal to the driver to control the driving power of the driver, so as to set the rotational speed of the engine shaft driven by the electric motor; and
a power transmission mechanism for transmitting the auxiliary power transmitted by the electric motor to the engine shaft.

5. The apparatus according to claim 4, wherein the power transmission mechanism is composed of a first timing belt pulley, a timing belt, a second timing belt pulley, a rotation shaft, a one-way driving belt pulley, a transmission belt and a driving belt pulley wherein the first timing belt pulley is fitted on the electric motor, the second timing belt pulley is fitted on the rotation shaft, the timing belt is mounted between the first timing belt pulley and the second timing belt pulley, the one-way driving belt pulley is fitted on the rotation shaft, the driving belt pulley is fitted on the engine shaft, and the transmission belt is mounted between the one-way driving belt pulley and the driving belt pulley.

6. A method for assisting an engine, for supplying auxiliary power from a power generating apparatus to an engine shaft when the engine is transmitting power to the engine shaft via a gearbox, the method comprising the steps of:
providing a power supply unit of the apparatus for providing a high voltage power;
providing a driver of the apparatus converting the high voltage power into a driving power source to be transmitted to an electric motor of the apparatus;
the electric motor of the apparatus converting the driving power into the auxiliary power to be transmitted to the engine shaft;
controlling the rotational speed of the electric motor driving the engine shaft to be higher than that of the engine driving the engine shaft, so as to supply the auxiliary power to the engine shaft,
wherein the electric motor is a direct-current motor, and the power supply unit comprises:
a battery or generator, the generator being driven by the engine; and
a converter for converting a low voltage of the battery or generator into the high power voltage to be applied to the driver.

7. The method according to claim 6, further comprising the steps of:
providing a controller of the apparatus for generating a control signal to the driver to control the driving power of the driver, so as to set the rotational speed of the engine shaft driven by the electric motor;
using a first power transmission mechanism of the apparatus for transmitting the auxiliary power transmitted by the electric motor;
providing a continuously variable transmission of the apparatus for transmitting the auxiliary power transmitted by the first power transmission mechanism; and
using a second power transmission mechanism of the apparatus for transmitting the auxiliary power transmitted by the continuously variable transmission to the engine shaft.

8. The method according to claim 7, wherein the first power transmission mechanism is composed of a first timing belt pulley, a timing belt and a second timing belt pulley wherein the first timing belt pulley is fitted on the electric motor, the second timing belt pulley is fitted on the continuously variable transmission, and the timing belt is mounted between the first timing belt pulley and the second timing belt pulley; the second power transmission mechanism is composed of an one-way driving belt pulley, a transmission belt and a driving belt pulley wherein the one-way driving belt pulley is fitted on the continuously variable transmission, the driving belt pulley is fitted on the engine shaft, and the transmission belt is mounted between the one-way driving belt pulley and the driving belt pulley.

9. The method according to claim 7 further comprising the steps of:
providing a controller of the apparatus generating a control signal to the driver to control the driving power source of the driver, so as to set the rotational speed of the engine shaft driven by the electric motor; and
providing a power transmission mechanism of the apparatus transmitting the auxiliary power transmitted by the electric motor to the engine shaft.

10. The method according to claim 9, wherein the power transmission mechanism is composed of a first timing belt pulley, a timing belt, a second timing belt pulley, a rotation shaft, a one-way driving belt pulley, a transmission belt and a driving belt pulley wherein the first timing belt pulley is fitted on the electric motor, the second timing belt pulley is fitted on the rotation shaft, the timing belt is mounted between the first timing belt pulley and the second timing belt pulley, the one-way driving belt pulley is fitted on the rotation shaft, the driving belt pulley is fitted on the engine shaft, and the transmission belt is mounted between the one-way driving belt pulley and the driving belt pulley.

* * * * *